United States Patent Office 2,988,542
Patented June 13, 1961

2,988,542
POLYMERIZATION OF FLUORINE CONTAINING MONOMERS
Manville Isager Bro, Robert J. Convery, and Ralph Courtenay Schreyer, Wilmington, Del., assignors to E. I. du Pont de Nemours and Company, Wilmington, Del., a corporation of Delaware
No Drawing. Filed Jan. 2, 1958, Ser. No. 706,546
4 Claims. (Cl. 260—87.5)

The present invention relates to an improved process for the polymerization of fluorinated monomers and more particularly to the polymerization of perfluorinated and substantially perfluorinated monomers in perfluorinated solvents using a highly fluorinated polymerization initiator.

Polymers and copolymers of fluorinated monomers such as tetrafluoroethylene, chlorotrifluoroethylene, hexafluoropropylene, octafluorobutene-1, hexafluorocyclobutene, omega-hydrononafluoropentene-1, etc. have heretofore generally been prepared by a polymerization in an aqueous medium with an inorganic or organic peroxide catalyst or by a bulk polymerization in liquid monomer employing a halogenated peroxide. Both systems have disadvantages which limit their utility. The aqueous polymerization system has a limited polymer-forming activity. Although suitable for the conversion of tetrafluoroethylene to high molecular weight polymer at rapid rates, the aqueous system is not as effective with other fluorine-containing monomers, since both the rate of polymerization and the molecular weight of the polymer obtained decrease significantly as the fluorinated monomer employed in the polymerization is increased in molecular weight. Even in the copolymerization of tetrafluoroethylene with fluorinated comonomers of higher molecular weight than tetrafluoroethylene the rate of polymerization is substantially affected. With some comonomers only liquids and waxes are obtained. The homo polymerization of hexafluoropropylene in an aqueous medium has not been successful. The bulk peroxide on the other hand is a highly active system. The disadvantage of such a system lies in the cost, in operating safety, in the control of the polymerization, and in reproducibility of product obtained. Many of the fluorinated monomers are gaseous at room temperature, tetrafluoroethylene for example, has a boiling point of −78° C. and bulk polymerization would thus require extensive refrigeration and/or pressure equipment. However, the major disadvantage results from the instability of halogenated peroxides. Thus, halogenated peroxides have a great tendency to cause explosions at room and elevated temperatures; they must therefore be prepared and stored at temperatures below 0° C., and even then safety is only obtained when stored in the form of dilute solutions. The exceedingly high rate of decomposition of halogenated peroxides will also generally limit the use of the halogenated peroxides to polymerizations at low temperatures if it is desired to obtain high molecular weight polymers. Due to the extreme sensitivity of the halogenated peroxides leading to frequent partial decomposition prior to use, combined with a difficulty to determine rapidly and accurately the concentration of peroxides, the production of polymers of constant molecular weight at reproducible rates is greatly impaired.

It is, therefore, the prime objective of the present invention to provide a polymerization process for the polymerization of fluorinated monomers which combines the safety of an aqueous polymerization process with the catalytic activity resulting from the use of halogenated peroxides. Another objective is the preparation of high molecular weight polymers of fluorine-containing monomers at reproducible high rates over a wide range of conditions. Other objects will become apparent hereinafter.

The objects of the present invention are accomplished by a process which comprises polymerizing a terminally unsaturated substantially completely fluorinated alkene in a non-aqueous medium comprising a halogenated solvent with a fluorinated peracid. In particular embodiments, the process of the present invention comprises polymerizing fluorinated monomers in substantially completely fluorinated solvents in the presence of a catalyst formed in situ by the reaction of a substantially fluorinated acid with hydrogen peroxide.

The novel catalysts employed in the present invention are peroxygenated acids having the general formula $R_fCOOOH$ which are formed by the reaction of hydrogen peroxide and a fluorinated acid according to the following equation

$$R_fCOOH + H_2O_2 \rightleftharpoons R_fCOOOH + H_2O \qquad (1)$$

or by the reaction of a fluorinated acid anhydride with hydrogen peroxide according to the following equation

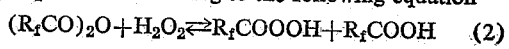

$$(R_fCO)_2O + H_2O_2 \rightleftharpoons R_fCOOOH + R_fCOOH \qquad (2)$$

where $R_f$ is a perfluoroalkyl or an omega-hydroperfluoroalkyl radical. Since the reaction of the fluorinated acid with hydrogen peroxide is an equilibrium reaction, it is clear that the presence of water is preferably avoided and that it is consequently preferred to react the hydrogen peroxide with the acid anhydride. The reaction of the acid or the anhydride with the hydrogen peroxide is very rapid and thus the catalyst employed in the present invention may be formed in situ at polymerization conditions. Hydrogen peroxide is generally obtained in aqueous solutions. Although from a standpoint of completion of reaction it would be preferably to employ very concentrated solutions of hydrogen peroxide, i.e. 90%, such solutions are not as safe as the more dilute solutions of hydrogen peroxide, i.e. 30%. The excess water in the polymerization system which would result from the use of more dilute solutions can be consumed by an excess of anhydride. Since the hydrogen peroxide is employed in catalytic quantities the quantity of the acid anhydride required to react with the water formed or present is small. Complete dehydration is of course necessary only when it is desired to obtain the maximum catalytic activity. It is possible to employ the acid and an aqueous solution of hydrogen peroxide and still obtain an active catalyst. It was found that unless in the equilibrium Equation 1 the water concentration is in excess of 50 mol percent of the acid concentration, the equilibrium is sufficiently pushed to the right to form catalytic quantities of the peracid. Hydrogen peroxide employed by itself in the absence of the acid or anhydride will not give rise to significant polymerization rates and leads to the formation of low molecular weight products.

The acid and acid anhydrides employed in the present invention as catalyst components comprise perfluorinated acids such as trifluoroacetic acid, pentafluoropropionic acid, perfluorobutyric acid, perfluorohexanoic acid, perfluorononanoic acid, etc.; and omega-hydroperfluorinated acids such as deca-fluorohexanoic acid, dodecafluorooctanoic acid, hexadecafluorononanoic acid, eicosofluoroundecanoic acid, etc. The anhydrides employed in the present invention are the anhydrides of the above described acids. The perfluorinated acids employed in the present invention may be prepared by electrolysis of the corresponding hydrocarbon acid with hydrogen fluoride as described in the literature. The omega-hydroperfluoroacids may be prepared from the corresponding alcohol as described in U.S. 2,559,752, issued July 10, 1951 to K. L. Berry. The alcohol is obtained by the telomerization of tetrafluoroethylene with methanol. The acid anhydrides may be obtained from the acids employing known reaction conditions to dehydrate the acids. The size of the fluorinated radical is of no critical consequence in the formation of the catalysts employed in the present invention; in general, acids having less than 10 carbon atoms are preferred because they are more readily available.

As stated hereinabove, the polymerization is carried out in a non-aqueous medium comprising a halogenated solvent. The choice of the solvent is primarily determined by the monomer to be employed in the polymerization. Thus in the homo- and copolymerization of tetrafluoroethylene it is essential to employ a substantially fluorinated solvent, inert towards the growing polymer chain. Hydrocarbons and chlorinated hydrocarbon solvents act as telogens in the polymerization and are thus preferably avoided. Solvents useful for the polymerization of tetrafluoroethylene and other perfluorinated monomers such as hexafluoropropylene and also useful in the copolymerization involving the perfluoroinated monomers are perfluorinated hydrocarbons and acids. Of these, the perfluorinated hydrocarbons such as perfluorodimethylcyclobutane, perfluorooctane, perfluorodecane, perfluorodimethylcyclohexane and perfluorokerosenes are preferred. The polymerization of substantially fluorinated monomers such as chlorotrifluoroethylene, bromotrifluoroethylene, chlorodifluoroethylene, trifluoroethylene may be carried out in such solvents as will dissolve both the catalyst and the monomer, and which are inert towards the growing polymer chain. Solvents which are suitable polymerization media for these monomers have been described in the literature. Where the monomers are liquid at polymerization conditions, no solvent is necessary in the process of the present invention.

The process of the present invention is particularly designed for the polymerization of substantially fluorinated monomers having the general formula

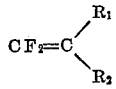

where $R_1$ is a hydrogen or halogen and preferably a fluorine, and $R_2$ is a hydrogen, halogen, perfluoroalkyl radical, perfluoroaryl radical and omega-hydroperfluoroalkyl radical.

The polymerization process of the present invention may be carried out over a wide range of conditions. Selection of the polymerization conditions will depend in general on the activity of the monomer. The catalyst system of the present invention may be employed from temperatures below 0° C. to about 100° C. At higher temperatures the catalyst decomposition rate is too fast to be practical for most fluorinated monomers. The optimum pressure will depend in each instance, on the monomer to be polymerized. However, catalytic acitvity per se is not affected by pressure and thus a wide range of pressures ranging from atmospheric pressure to pressures above 1000 atmospheres can be employed.

The peracid catalysts of the present invention may be formed in a prior step by the reaction of the fluorinated acid and/or the fluorinated anhydride with hydrogen peroxide at room temperature, or below, under conditions conductive to the removal of water and stored until ready for use. But preferably, due to the highly active nature of the peracids, the catalyst is formed in situ by the injection of hydrogen peroxide into the polymerization system containing the fluorinated acid and/or the fluorinated anhydride. The proportions of the hydrogen peroxide to the fluorinated acid or the fluorinated anhydride are not critical, but in general it is desirable to employ a molar excess of the acid or anhydride; this will also favor the equilibrium towards the formation of the peracid. The quantity of the catalyst employed again depends on the polymerization conditions as well as the monomer and may vary from 0.001% to 10% by weight of hydrogen peroxide based on the weight of the monomer.

The invention is further illustrated by the following examples.

*Example I*

Into a 185 ml. stainless steel autoclave was charged under nitrogen 50 ml. of perfluorodimethylcyclobutane, 5 g. of trifluoroacetic anhydride, and 0.25 ml. of a 0.3% aqueous hydrogen peroxide solution. The nitrogen was replaced with tetrafluoroethylene and additional tetrafluoroethylene was added until a pressure of 400 p.s.i.g. was obtained. The reaction mixture was agitated at room temperature while maintaining the pressure for a period of 30 minutes. The resulting mixture was filtered, and the solid product obtained was washed and dried at 100° C. in a vacuum oven for 15 hours. The yield of polytetrafluoroethylene was 20.2 g. The polytetrafluoroethylene powder could be compression molded into chips which on heating to a sintering temperature above 327° C. were tough and flexible.

*Example II*

Into a 185 ml. stainless steel autoclave was charged under nitrogen at 0° C. 50 ml. of perfluorodimethylcyclobutane, 3 g. trifluoroacetic anhydride, 0.25 g. of a 30% aqueous hydrogen peroxide solution. The mixture was warmed to room temperature and pressured with tetrafluoroethylene to a pressure of 400 p.s.i.g. The reaction mixture was heated to 75° C. and maintained at that temperature for 10 minutes with agitation. The reaction vessel was then cooled and the reaction products removed. On washing, filtering and drying there was obtained 63 g. of solid polytetrafluoroethylene which could be molded into tough chips.

The example was repeated except that instead of the 3 g. trifluoroacetic anhydride and 0.25 g. of the hydrogen peroxide solution there was employed only 1 g. of a 30% hydrogen peroxide solution. There was obtained 1.5 g. of low molecular weight polytetrafluoroethylene.

*Example III*

The procedure of Example II was repeated except that the catalyst comprised 10 g. of trifluoroacetic acid and 0.25 g. of a 3% hydrogen peroxide solution. There was obtained 34.5 g. of solid polytetrafluoroethylene.

*Example IV*

Into a 185 ml. stainless steel autoclave was charged at 0° C. under nitrogen 50 ml. of trifluoroacetic acid and 1 g. of a 30% hydrogen peroxide solution. The reaction vessel was warmed to room temperature and pressured with tetrafluoroethylene to 400 p.s.i.g. The reaction mixture spontaneously heated to 100° C. and was cooled to room temperature over a period of 40 minutes. On work-up of the contents, 21 g. of polytetrafluoroethylene was obtained.

*Example V*

Employing the procedure of Example II, tetrafluoroethylene was polymerized with 5 g. of trifluoroacetic anhydride and 0.25 ml. of a 3% hydrogen peroxide solution. On work-up there was obtained 22.3 g. of solid polytetrafluoroethylene.

*Example VI*

Employing the procedure of Example II, tetrafluoroethylene was polymerized with 10 g. of tetrafluoropropionic acid and 0.1 g. of a 30% hydrogen peroxide solution. On work-up there was obtained 10.2 g. of solid polytetrafluoroethylene.

*Example VII*

Employing the procedure of Example II, tetrafluoroethylene was polymerized with 5 g. of perfluorobutyric anhydride and 0.1 g. of a 30% hydrogen peroxide solution at a pressure of 300 to 340 p.s.i.g. There was isolated on work-up 32.7 g. of solid polytetrafluoroethylene.

Example VIII

Employing the procedure of Example II, it was attempted to polymerize tetrafluoroethylene in 38 ml. of distilled, deoxygenated, demineralized water with 12 ml. of trifluoroacetic acid and 1 g. of a 30% hydrogen peroxide solution. No solid products were isolated from the resulting reaction mixture.

Example IX

Into a 180 ml. stainless steel vessel was charged at 0° C. under nitrogen 50 ml. of perfluorodimethylcyclobutane, 5 g. of trifluoroacetic anhydride and 0.25 g. of a 30% hydrogen peroxide solution. The reaction vessel was cooled to —50° C., evacuated and 30 g. of hexafluoropropylene and 15 g. of tetrafluoroethylene was charged to the vessel. The reaction vessel was heated to 50° C. and agitated at that temperature for a period of 60 minutes. The resulting reaction mixture was filtered, and the product was washed and dried. There was obtained 18.4 g. of a solid copolymer of tetrafluoroethylene and hexafluoropropylene containing 9% of hexafluoropropylene, which could be molded at 340° C. into tough, clear films.

Example X

Into a 85 ml. stainless steel autoclave was charged at a temperature of —80° C. 30 ml. of hexafluoropropylene, 5 g. of trifluoroacetic acid, 0.25 g. of a 30% hydrogen peroxide solution and 20 g. of tetrafluoroethylene. The reaction vessel was warmed to 50° C. and agitated at that temperature for a period of one hour. On work-up of the resulting mixture there was obtained 11.3 g. of a copolymer of tetrafluoroethylene and hexafluoropropylene containing 14% by weight of the copolymer of hexafluoropropylene.

Example XI

Employing the procedure of Example IX, 30 g. of hexafluoropropylene and 15 g. of tetrafluoroethylene were copolymerized in 50 ml. of trifluoroacetic acid with 1 g. of a 30% hydrogen peroxide solution. On work-up there was obtained 4.5 g. of a copolymer of tetrafluoroethylene and hexafluoropropylene.

Example XII

Employing the procedure of Example IX, 35 g. of chlorotrifluoroethylene was polymerized in 50 ml. of perfluorodimethylcyclobutane with 5 g. of trifluoroacetic anhydride and 0.25 g. of a 30% hydrogen peroxide solution. There was obtained on work-up 30.5 g. of a solid polymer of chlorotrifluoroethylene having a melting point at about 210° C.

Example XIII

Employing the procedure of Example IX, 50 g. of vinyl fluoride was polymerized in 50 ml. of perfluorodimethylcyclobutane with 5 g. of trifluoroacetic anhydride and 0.1 g. of a 30% solution of hydrogen peroxide. Solid polyvinyl fluoride weighing 1 g. was isolated from the reaction mixture.

The foregoing examples have illustrated the process of the present invention in some of its particular embodiments. Although the formation of the fluorinated peracids was known heretofore [see J. Am. Chem. Soc. 76, 3468, (1954)], it was not known that these compounds were active polymerization catalysts; such catalytic activity is quite remarkable in view of the known behavior of peracids in oxidizing olefins to diols.

The advantages of the process of the present invention are particularly the high catalytic activity of the substantially fluorinated peracids which allows rapid polymerizations at ordinary temperatures and low pressures, and the high degree of safety which is attained by being able to keep the catalyst forming reagents separately and form the catalyst in situ. Additional advantages are the fact that no metallic reagents need be used which can contaminate the polymer, the fact that the catalyst is soluble in inert solvents which are also solvents for the monomers and that the catalyst system can be employed in bulk polymerizations.

We claim:

1. A process for the polymerization of fluorinated alkenes having the general formula $CF_2=CFX$, where X is a member of the class consisting of fluorine, perfluoroalkyl and omega-hydroperfluoroalkyl radicals, which comprises contacting said alkene at a temperature of room temperature to 100° C. with a fluorinated organic per acid catalyst in a substantially non-aqueous, perfluorinated, inert hydrocarbon, liquid at polymerization conditions, said catalyst being formed by the reaction of 0.001 to 10%, by weight of alkene, of hydrogen peroxide and a molar excess of a member of the class consisting of trifluoroacetic anhydride, trifluoroacetic acid and mixtures thereof.

2. The process as set forth in claim 1 wherein the perfluorinated hydrocarbon is perfluorodimethylcyclobutane.

3. The process as set forth in claim 1 wherein the alkene is tetrafluoroethylene.

4. The process as set forth in claim 1 wherein the alkene is a mixture of tetrafluoroethylene and hexafluoropropylene.

References Cited in the file of this patent

UNITED STATES PATENTS

| 2,626,254 | Miller | Jan. 20, 1953 |
| 2,820,027 | Hanford | Jan. 14, 1958 |
| 2,885,448 | Miller | May 5, 1959 |